3,591,611
3-OXYGENATED-17-UREIDO-ANDROSTANES
AND PROCESS
Glen E. Arth, Cranford, Lewis H. Sarett, Princeton, and Arthur A. Patchett, Cranford, N.J., assignors to Merck & Co., Inc., Rahway, N.J.
No Drawing. Filed Aug. 4, 1969, Ser. No. 847,462
Int. Cl. C07c 169/14
U.S. Cl. 260—397.3      14 Claims

ABSTRACT OF THE DISCLOSURE

The invention disclosed herein relates to novel steroid compounds and processes for preparing them. More particularly, it relates to 3-oxygenated-17-ureido steroids of the androstane series which are effective as androgen biosynthesis inhibitors. These 3-oxygenated-17 - ureido androstanes are prepared starting with a 3-oxygenated-5-pregnene-20-one compound, e.g. pregnenolone acetate, as follows: the 3 - oxygenated - 5 - pregnene-20-one compound is reacted with hydroxylamine to form the 20-oxime which is then reacted with phosphorous oxychloride thereby forming the corresponding 3 - oxygenated - 17 - acetamido-androst-5-ene compound; the latter compound is then hydrolyzed to form the corresponding 17-amino compound which, upon reaction with potassium cyanate, is converted to the corresponding 3 - oxygenated - 17-ureido-androst - 5 - ene compound. Where pregnenolone acetate per se is used as starting material, the compound obtained is 3 - hydroxy - 17 - ureido-androst-5-ene which is then oxidized to produce 17 - ureido-androst-4-ene-3-one.

---

These 3-oxygenated-17-ureido-androstanes and unsaturated derivatives, subject of the present invention, are characterized by having in ring D the following structure:

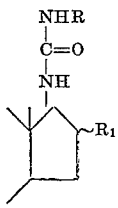

wherein R is hydrogen, alkyl, or acyl; and $R_1$ is hydrogen, α-methyl, β-methyl, or methylene.

Included within the purview of the invention are compounds having the following chemical formula:

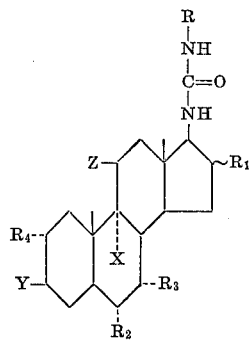

and $\Delta^4$-dehydro, $\Delta^5$-dehydro, $\Delta^{1,4}$-bis-dehydro, $\Delta^{4,6}$-bis-dehydro, and $\Delta^{1,4,6}$-tris-dehydro derivatives; wherein R and $R_1$ have the significance above-defined; X is hydrogen or halo; Y is hydrogen, keto, hydroxy, or lower alkanoyloxy; Z is hydrogen, β-hydroxy, or keto; and $R_2$, $R_3$ and $R_4$ are hydrogen, methyl, halo or formyl; as for example, 17-ureido-androst-4-ene-3-one;
17-ureido-androst-1,4-diene-3-one;
17-ureido-androst-4,6-diene-3-one;
17-ureido-androst-1,4,6-triene-3-one;
9α-fluoro-11β-hydroxy-17-ureido-androst-4-ene-3-one;
9α-fluoro-11β-hydroxy-17-ureido-androst-1,4-diene-3-one;
9α-fluoro-11β-hydroxy-17-ureido-androst-4,6-diene-3-one;
9α-fluoro-11β-hydroxy-17-ureido-androst-1,4,6-triene-3-one;
and 2-methyl; 2-formyl; 2-halo; 6-methyl; 6-halo, preferably 6-fluoro or 6-chloro; and 7-methyl derivatives thereof; also included are
16(α and β)-methyl-17-ureido-androst-4-ene-3-one;
16(α and β)-methyl-17-ureido-androst-1,4-diene-3-one;
16(α and β)-methyl-17-ureido-androst-4,6-diene-3-one;
16(α and β)-methyl-17-ureido-androst-1,4,6-triene-3-one;
16(α and β)-methyl-9α-fluoro-11β-hydroxy-17-ureido-androst-4-ene-3-one;
16(α and β)-methyl-9α-fluoro-11β-hydroxy-17-ureido-androst-1,4-diene-3-one;
16(α and β)-methyl-9α-fluoro-11β-hydroxy-17-ureido-androst-4,6-diene-3-one;
16(α and β)-methyl-9α-fluoro-11β-hydroxy-17-ureido-androst-1,4,6-triene-3-one;
6,16-dimethyl-17-ureido-androst-4-ene-3-one;
6,16-dimethyl-17-ureido-androst-1,4-diene-3-one;
6,16-dimethyl-17-ureido-androst-4,6-diene-3-one;
6,16-dimethyl-17-ureido-androst-1,4,6-triene-3-one;
6,16-dimethyl-9α-fluoro-11β-hydroxy-17-ureido-androst-4-ene-3-one;
6,16-dimethyl-9α-fluoro-11β-hydroxy-17-ureido-androst-1,4-diene-3-one;
6,16-dimethyl-9α-fluoro-11β-hydroxy-androst-4,6-diene-3-one;
and 6,16-dimethyl-9α-fluoro-11β-hydroxy-17-ureido-androst-1,4,6-triene-3-one, and the like.

These novel 3-oxygenated-17-ureido-androstane compounds, which term shall be here taken to include the corresponding unsaturated derivatives, are conveniently prepared by reacting a 3-oxygenated-17-amino-androst-5-ene compound such as 3 - hydroxy - 17 - amino-androst-5 - ene, 3 - ethylenedioxy - 17 - amino-androst-5-ene, 3 - ethylenedioxy - 9α - fluoro - 11β - hydroxy - 17-amino-androst - 5 - ene, and the like, with potassium cyanate. The reaction is preferably conducted by heating the reactants together in aqueous alcoholic solution, and then adding aqueous mineral acid solution, e.g. aqueous hydrochloric acid, to the hot reaction solution, which is ordinarily maintained under reflux for a short additional period of time. The resulting mixture is cooled, water is added, and the precipitated material is conveniently recovered by filtration. The material thus obtained may be recrystallized from an organic solvent such as methanol to give, in substantially pure form, the corresponding 3-oxygenated - 17 - ureido-androst-5-ene; as for example, 3 - hydroxy - 17 - ureido-androst - 5 - ene; 3-ethylenedioxy-17 - ureido-androst-5-ene; 3 - ethylenedioxy-9α-fluoro-11β - hydroxy - 17 - ureido-androst-5-ene; and the like. Where the 3 - oxygenated - 17 - ureido-androst-5-ene compound is a 3 - hydroxy - 17 - ureido-androst-5-ene, this can be reacted with an oxidizing agent, such as cyclohexanone-aluminum isopropoxide, to produce the corresponding 17 - ureido-androst - 4 - ene - 3 - one; a 3-ethylenedioxy - 17 - ureido-androst - 5 - ene, upon reaction with an aqueous acidic hydrolyzing agent such as p-toluene sulfonic acid in aqueous methanol, is converted directly to the corresponding 17 - ureido-androst - 4 - ene-3 - one compound such as 17 - ureido-androst - 4 - ene- 3 - one; 9α - fluoro - 11β - hydroxy - 17 - ureido-androst-4-ene-3-one; and the like.

These 17-ureido-androst-4-ene-3-ones can be reacted (after protecting the 17-ureido substituent by acylation) with dichlorodicyanobenzoquinone followed by hydrolysis with aqueous mineral acid solution, thereby forming the corresponding 17 - ureido - androst-1,4-diene-3-one compound such as 17 - ureido-androst-1,4-diene-3-one; 9α-fluoro-11β-hydroxy - 17 - ureido-androst-1,4-diene-3-one; and the like. If desired, the 17-ureido-androst-4-ene (or 1,4-diene)-3-one compound can be reacted (after protecting the 17-ureido substituent by acylation) with chloranil, preferably in t-butyl alcohol, thereby forming the corresponding 17-ureido-androst-4,6-diene-3-one; 17-ureido-androst-1,4,6-triene-3-one; 9α-fluoro - 11β - hydroxy-17-ureido-androst - 4,6 - diene-3-one; 9α-fluoro-11β-hydroxy-17-ureido-androst-1,4,6-triene-3-one; and the like.

The 3-oxygenated-17-ureido-androstanes of this invention are extremely active in lowering the biosynthesis of testicular androgens, which can stimulate overdevelopment of sebaceous glands with resultant acne, and which are often productive of prostatic enlargement. These 3-oxygenated-17-ureido-androstane compounds are ordinarily utilized in admixture with a pharmacologically acceptable solid or liquid carrier, and are prepared for administration in convenient dosage form such as pills, tablets, capsules, syrups for oral uses, or in a liquid form adapted for administration of steroidal hormone products by injection; microcrystalline aqueous suspensions or oil in water emulsions can be prepared for parenteral dosage; or incorporated in creams, lotions, and the like, for topical administration.

Moreover, these 3-oxygenated-17-ureido - androstane compounds are potent inhibitors of 5α-reductase, an enzyme which can convert 3-keto-$\Delta^4$-steroids to the corresponding 3-keto-5α-dihydro-steroid (e.g., testosterone to 5α-dihydro-testosterone), and are therefore valuable for the control of metabolic disorders dependent upon the presence of the 5α-dihydro-steroid moiety.

The following examples illustrate methods of preparing the novel 3-oxygenated-17-ureido-androstane compounds of this invention, but it is thereby understood that these examples are given for purposes of illustration and not of limitation.

EXAMPLE 1

A solution of 45 gms. of sodium hydroxide in 150 ml. water is added to a solution of approximately 5 gms. of 3-acetoxy-17-acetamidoandrost-5-ene in 350 ml. of ethanol. The resulting mixture is heated, with stirring, at a temperature of approximately 180° C. under pressure in a nitrogen atmosphere for a period of about 8 hours. The reaction solution is filtered through diatomaceous silica, and the resulting solution is evaporated in vacuo to form a syrup; water is added to this residual syrup, the resulting mixture is extracted with chloroform, and the chloroform extract is washed with water. To the resulting chloroform solution is then added an aqueous hydrochloric acid solution (2.5 N), and the precipitate which forms is filtered, washed with chloroform, then, with acetone, and dried to give approximately 4 gms. of 3-hydroxy-17-amino-androst-5-ene hydrochloride.

Approximately 5 gms. of 3-hydroxy-17-amino-androst-5-ene hydrochloride is suspended in about 50 ml. ethanol, and to this suspension is added a solution containing about 7.5 gms. of potassium cyanate in 10 ml. of water. The mixture is heated on a steam bath for approximately 2–3 minutes, about 7.5 ml. of a 2.5 N aqueous hydrochloric acid solution is added, and the resulting mixture is then heated under reflux for a period of about 15 minutes. The reaction mixture is filtered while hot, the filtered solution is cooled and water is added until crystallization is complete. The crystalline precipitate is recovered by filtration, washed with water, and dried to give approximately 5 gms. of 3-hydroxy-17-ureido-androst-5-ene.

To a dry solution containing about 5 gms. of 3-hydroxy-17-ureido-androst-5-ene, 150 ml. of benzene and 25 ml. of cyclohexanone is added approximately 6 g. of aluminum isopropoxide. The resulting mixture is heated under reflux for a period of approximately 3 hours, the reaction solution is cooled, and to the cooled solution is added about one liter of saturated Rochelle salt solution. The resulting mixture is then steam distilled until no cyclohexanone remains in the reaction mixture. The resulting aqueous mixture is cooled; extracted with chloroform; and the chloroform extract is washed with water, dried over anhydrous sodium sulfate, and the chloroform evaporated in vacuo. The residual material is crystallized from chloroform-ethyl acetate, and the crystalline material is dried to give approximately 5 gms. of 17-ureido-androst-4-ene-3-one.

The 3-acetoxy-17-acetamido-androst-5-ene utilized as starting material hereinabove is conveniently prepared starting with pregnenolone acetate as follows:

A solution containing about 54 g. of hydroxylamine hydrochloride and 120 g. of sodium acetate trihydrate dissolved in 200 ml. of water is added with stirring, over a period of approximately 5 minutes, to a solution of 110 g. of 3-acetoxy-pregn-5-ene-20-one in 2600 ml. of methanol. Shortly after addition, a precipitate forms; the resulting mixture is heated under reflux for a period of approximately 2 hours, and the reaction mixture is cooled. 600 ml. of water is added, and the material which precipitates is recovered by filtration, washed with water, and dried to give about 119 g. of 3-acetoxy-20-oximino-pregn-5-ene; M.P. 195° C.

This 119 g. of 3-acetoxy-20-oximino-pregn-5-ene is partially dissolved in 200 ml. of pyridine, and the resulting mixture is cooled to about −10° C. A solution of 100 ml. of phosphorus oxychloride in 200 ml. pyridine is then added to this mixture at such a rate as to maintain the temperature between −15° C. and −10° C. The resulting mixture is stirred for an additional period of approximately 3 hours at a temperature of about 0° C., and the creamy reaction mixture is poured slowly onto ice. The material which precipitates is recovered by filtration, and dissolved in chloroform. The chloroform solution is washed repeatedly with water, dried over sodium sulfate, and evaporated under reduced pressure to give an oil, which crystallizes upon addition of methanol, to give approximately 100 g. of 3-acetoxy-17-acetamido-androst-5-ene.

EXAMPLE 2

A solution containing about 3 g. of 17-ureido-androst-4-ene-3-one in 100 cc. of acetic anhydride is stirred at about 35° C. for approximately 24 hours. At this time, any crystalline material which separates from the reaction mixture is recovered by filtration, washed with ether and dried. The filtered reaction mixture is then heated at a temperature of 35° C. for an additional 24 hour period, and the crystalline material which separates is recovered by filtration, washed with ether, dried and combined with that previously recovered to give approximately 3 g. of 17-(N'-acetyl)-ureido-androst-4-ene-3-one.

Approximately 4.5 grams of 17-(N'-acetyl)-ureido-androst-4-ene-3-one and 4.5 grams of dichlorodicyanobenzoquinone are added to 90 ml. of dioxane, and the resulting mixture is heated under reflux in a nitrogen atmosphere for a period of approximately 3 hours, during which time dissolution occurs with a color change to deep red. The reaction solution is cooled, ethyl acetate is added to ensure solution of product, and the insoluble material is filtered off and washed with ethyl acetate. The ethyl acetate-dioxane filtered solution is washed with 1 N aqueous sodium hydroxide solution, thereby removing the deep red color from the organic layer. The organic layer is then washed with water, dried over anhydrous sodium sulfate, and the solvents evaporated in vacuo while maintaining the temperature below about 40° C. The residual material is dried to give about 4.2 g. of 17-(N'-acetyl) ureido-androst-1,4-diene-3-one. This material is purified by chromatography on alumina using chloroform-ether mixtures as the eluting solvent to give approximately 4 g. of substantially pure 17-(N'-acetyl)-ureido-androst-1,4-diene-3-one; M.P. 270–272° C.

Approximately 100 mg. of 17-(N'-acetyl)-ureido-androst-1,4-diene-3-one is dissolved in about 10 cc. of boiling ethanol, 2.5 ml. of 2.5 N aqueous hydrochloric acid solution is added, and the resulting mixture is heated at reflux temperature for a period of approximately one hour. About 5 ml. of water is added to the reaction mixture, and the resulting aqueous mixture is evaporated under reduced pressure to a volume of approximately 3 ml. The resulting oily mixture is extracted with chloroform, the chloroform extract is washed several times with water, and the washed chloroform extract is evaporated to give an oil which crystallizes from acetone to give substantially pure 17-ureido-androst-1,4-diene-3-one.

EXAMPLE 3

To a solution containing 50 g. of testosterone in 900 ml. of benzene is added 80 ml. ethylene glycol and 1.25 g. of p-toluene sulfonic acid. The resulting mixture is heated under reflux for about 15 hours in an apparatus which provides for the separation of water from the reflux benzene-water condensate. The reaction solution is cooled, 5 ml. of pyridine is added to destroy the catalyst, and the reaction mixture is poured into a saturated aqueous sodium bicarbonate solution. Approximately 200 ml. of benzene is then added, and the organic layer is separated, washed twice with saturated aqueous sodium bicarbonate solution, twice with water, and then dried over anhydrous sodium sulfate. The dried benzene extract is evaporated in vacuo, and the residual material is crystallized from methanol to give approximately 42 g. of 3-ethylenedioxy-17$\beta$-hydroxy-androst-5-ene.

Approximately 42 g. of chromium trioxide is dissolved in 32 ml. of water, and the resulting aqueous solution is added to 320 ml. pyridine. To this solution is added a solution of 42 g. of 3-ethylene-dioxy-17$\beta$-hydroxy-androst-5-ene in 320 ml. of pyridine. The mixing of the two solutions is accompanied by evolution of heat, and the mixture turns black; the resulting mixture is stirred at room temperature for a period of about 15 hours. Water is then added to the dark reaction mixture (total volume approximately 5 liters), and the resulting mixture is extracted of ethyl acetate; five separate extractions are carried out, care being used to avoid vigorous shaking which forms an emulsion. The combined ethyl acetate extracts are washed with water, dried over anhydrous sodium sulfate, and the ethyl acetate is evaporated under reduced pressure. The residual material is recrystallized from ether to give about 26 g. of substantially pure 3-ethylenedioxy-androst-5-ene-17-one; M.P. 191–194° C.

Approximately 20 g. of 3-ethylenedioxy-androst-5-ene-17-one is dissolved in about 720 ml. pyridine, and to this solution is added a solution containing 42 g. of hydroxylamine hydrochloride dissolved in 90 ml. of water. The resulting solution is heated under reflux for a period of about three hours. The reaction mixture is cooled, water is added to precipitate the steroid, which is recovered by filtration, washed with water, and air-dried to give about 17 g. of 3-ethylenedioxy-17-oximino-androst-5-ene.

About 7 grams of 3-ethylenedioxy-17-oximino-androst-5-ene is partially dissolved in 1.5 liters of ethanol, and about 150 grams of sodium metal (cut into small pieces) is added portionwise to this solution over a period of about 5–6 hours. At the end of about 3 hours following the start of the addition, the reaction mixture is heated to a temperature of 110–120 C., and maintained at that temperature until the remaining sodium has been added and has reacted. The heating is then discontinued, 150 ml. of water is added slowly to the reaction solution, the ethanol is then evaporated in vacuo, and the white-colored residual material is placed under vacuum for a period of about 15 hours. The resulting mixture is cooled, and water is added until a precipitate begins to form. The aqueous mixture is then extracted four times with chloroform, and the combined chloroform extracts are washed twice with water, dried over anhydrous sodium sulfate, evaporated in vacuo, and the residual material recrystallized from ethyl acetate to give about 7 g. of substantially pure 3-ethylenedioxy-17-amino-androst-5-ene M.P. 180–182° C.

About 6.7 g. of 3-ethylenedioxy-17-amino-androst-5-ene is dissolved in 65 ml. of hot ethanol, and to this ethanol solution is added an aqueous solution containing 9.5 g. of potassium cyanate in 13 ml. of water. The precipitate which forms at first re-dissolves with continued heating. Approximately 40 ml. of a 2.5 N aqueous hydrochloric acid solution is then added to the hot reaction solution in a steady stream, while keeping the pH above about 7. The resulting solution is heated under reflux for a period of about 15 minutes, during which time a precipitate appears. The reaction mixture is then cooled, water is added and the precipitated material is recovered by filtration, washed with water, air-dried, and recrystallized from methanol to give about 7 g. of substantially pure 3-ethylenedioxy-17-ureido-androst-5-ene; M.P. 320° C. with decomposition.

A mixture containing about 7 g. of 3-ethylenedioxy-17-ureido-androst-5-ene, 7 g. of p-toluene sulfonic acid, 700 ml. methanol, and 140 ml. water is stirred at room temperature for a period of about 15 hours. The aqueous methanolic reaction solution is then evaporated in vacuo until the residual solution becomes cloudy; water is then added, and the resulting aqueous mixture is extracted four times with chloroform. The combined chloroform extracts are washed with water, dried over anhydrous sodium sulfate, and the chloroform evaporated in vacuo to give above 7.0 g. of crude 17-ureido-androst-4-ene-3-one. This material is purified by chromotography using an alumina column and chloroform as the developing and eluting solvents; the partially-purified material is crystallized from methanol to give about 4 g. of substantially pure 17-ureido-androst-4-ene-3-one in the form of its dihydrate; M.P. 208–209° C.

EXAMPLE 4

Approximately 13 g. of 3-ethylenedioxy-11$\beta$,17$\alpha$,20,21-tetrahydroxy-9$\alpha$-fluoro-pregn-5-ene are dissolved in 100 ml. of pyridine, the solution is filtered thereby removing insoluble material, and the resulting solution is diluted with 100 ml. of methanol. The resulting solution is maintained at a temperature of approximately 25° C. while adding thereto a solution containing about 24.5 g. of periodic acid in 100 ml. of water, and the mixture is stirred at room temperature for a period of about 2 hours. Approximately 100 ml. of 10% aqueous sodium bicarbonate solution is then added to the reaction mixture, additional water is added, and the aqueous mixture is extracted with chloroform. The chloroform extract is washed with saturated aqueous sodium chloride solution, dried and evaporated in vacuo; and the residual mixture is triturated with ether thereby forming a crystalline material which is recovered by filtration and dried to give about 4 g. of 3-ethylenedioxy-9$\alpha$-fluoro-11$\beta$ - hydroxy-androst-5 - ene-17-one.

A solution of about 5.4 g. of hydroxylamine hydrochloride and 12 g. of sodium acetate trihydrate in 20 ml. of water is added, with stirring over a period of approximately 5 minutes, to a solution containing about 11 g. of 3-ethylenedioxy-9$\alpha$-fluoro-11$\beta$-hydroxy-androst-5-ene-17-one dissolved in 260 ml. of methanol. Shortly after addition, a precipitate forms; the resulting mixture is heated under reflux for a period of approximately 2 hours, and the reaction mixture is cooled. About 60 ml. of water is added, and the material which precipitates is recovered by filtration, washed with water, and dried to give about 11 g. of 3-ethylenedioxy-9$\alpha$-fluoro-11$\beta$-hydroxy-17-oximino-androst-5-ene.

To a solution containing about 5.4 g. of 3-ethylenedioxy-9α-fluoro-11β-hydroxy-17-oximino - androst - 5-ene dissolved in 200 ml. of dioxane is added about 3 ml. of Raney nickel catalyst, and the mixture is shaken in contact with a hydrogen atmosphere at a pressure of approximately 42 lbs./in.$^2$ for a period of about 17 hours. At the end of this time, an additional 1.5 ml. of Raney nickel catalyst is added, and the shaking in contact with hydrogen is continued for an additional 26 hour period; another 1.5 ml. of Raney nickel catalyst is then added, and the shaking in contact with hydrogen is continued for an additional 30 hour period, at the end of which time the theoretical amount of hydrogen has been absorbed. The catalyst is then removed by filtration through diatomaceous silica, the filter cake is washed with ethanol, and the filtered solution is evaporated to dryness under reduced pressure to give approximately 5 g. of 3-ethylenedioxy-9α-fluoro-11β-hydroxy-17-amino-androst-5-ene.

About 6.7 g. of 3-ethylenedioxy-9α-fluoro-11β-hydroxy-17-amino-androst-5-ene is dissolved in 65 ml. of hot ethanol, and to this ethanol solution is added an aqueous solution containing 9.5 g. of potassium cyanate in 13 ml. of water. The precipitate which forms at first re-dissolves with continued heating. Approximately 40 ml. of a 2.5 N aqueous hydrochloric acid solution is then added to the hot reaction solution in a steady stream, while keeping the pH above about 7. The resulting solution is heated under reflux for a period of about 15 minutes, during which time a precipitate appears. The reaction mixture is then cooled, water is added and the precipitated material is recovered by filtration, washed with water, air-dried, and recrystallized from methanol to give about 7 g. of substantially pure 3-ethylenedioxy-9α-fluoro-11β-hydroxy-17-ureido-androst-5-ene.

A mixture containing about 7 g. of 3-ethylene-dioxy-9α-fluoro - 11β - hydroxy - 17 - ureido-androst-5-ene, 7 g. of p-toluene sulfonic acid, 700 ml. methanol, and 140 ml. water is stirred at room temperature for a period of about 15 hours. The aqueous methanolic reaction solution is then evaporated in vacuo until the residual solution becomes cloudy; water is then added, and the resulting aqueous mixture is extracted four times with chloroform. The combined chloroform extracts are washed with water, dried over anhydrous sodium sulfate, and the chloroform evaporated in vacuo to give about 7.8 g. of crude 9α-fluoro 11β - hydroxy - 17 - ureido-androst-4-ene-3-one. This material is purified by chromatography using an alumina column and chloroform as the developing and eluting solvents: the partially-purified material is crystallized from methanol to give about 4 g. of substantially pure 9α-fluoro - 11β - hydroxy - 17 - ureido - androst-4-ene-3-one.

The 3 - ethylenedioxy - 11β,17α,20,21-tetrahydroxy-9α-fluoro-pregn-5-ene used as starting material in this example is conveniently prepared by reacting 9α-fluorocortisone acetate with ethylene glycol in the presence of p-toluene sulfonic acid thereby forming 3-ethylenedioxy-9α - fluoro - 17α - hydroxy - 21-acetoxy-pregn-5-ene-11, 20-dione which is then reacted with lithium aluminum hydride thereby reducing the keto groupings at the 3- and 20-positions and simultaneously saponifying the 21-acetoxy substituent, to form 3-ethylenedioxy-11β,17α,20,21-tetrahydroxy-9α-fluoro-pregn-5-ene.

EXAMPLE 5

A solution containing about 3 g. of 9α-fluoro-11β-hydroxy - 17 - ureido-androst-4-ene-3-one in 100 cc. of acetic anhydride is stirred at about 35° C. for approximately 24 hours. At this time, any crystalline material which separates from the reaction mixture is recovered by filtration, washed with ether and dried. The filtered reaction mixture is then heated at a temperature of 35° C. for an additional 24 hour period, and the crystalline material which separates is recovered by filtration, washed with ether, dried and combined with that previously recovered to give approximately 3 g. of 9α-fluoro-11β-hydroxy - 17(N' - acetyl) - ureido-androst-4-ene-3-one.

Approximately 4.5 grams of 9α-fluoro-11β-hydroxy-17-(N' - acetyl)-ureido-androst-4-ene-3-one and 4.5 grams of dichlorodicyanobenzoquinone are added to 90 ml. of dioxane, and the resulting mixture is heated under reflux in a nitrogen atmosphere for a period of approximately 3 hours, during which time dissolution occurs with a color change to deep red. The reaction solution is cooled, ethyl acetate is added to ensure solution of product, and the insoluble material is filtered off and washed with ethyl acetate. The ethyl acetate-dioxane filtered solution is washed with 1 N aqueous sodium hydroxide solution, thereby removing the deep red color from the organic layer. The organic layer is then washed with water, dried over anhydrous sodium sulfate, and the solvents evaporated in vacuo while maintaining the temperature below about 40° C. The residual material is dried to give about 4.2 g. of 9α-fluoro-11β-hydroxy-17-(N'-acetyl)-ureido-androst-1,4-diene-3-one.

Approximately 100 mg. of 9α-fluoro-11β-hydroxy-17-(N' - acetyl)-ureido-androst - 1,4 - diene - 3 - one is dissolved in about 10 cc. of boiling ethanol, 2.5 ml. of 2.5 N aqueous hydrochloric acid solution is added, and the resulting mixture is heated at reflux temperature for a period of approximately one hour. About 5 ml. of water is added to the reaction mixture, and the resulting aqueous mixture is evaporated under reduced pressure to a volume of approximately 3 ml. The resulting oily mixture is extracted with chloroform, the chloroform extract is washed several times with water, and the washed chloroform extract is evaporated to give an oil which crystallizes from acetone to give substantially pure 9α-fluoro-11β-hydroxy-17-ureido-androst-1,4-diene-3-one.

EXAMPLE 6

To a suspension of 0.5 g. of 9α-fluoro-11β-hydroxy-17 - (N' - acetyl) - ureido-androst-4-ene-3-one in 2 ml. of dry tetrahydrofuran is added about 0.75 ml. of triethyl ortho-formate, 0.27 ml. of ethanol, and 0.1 g. of p-toluene sulfonic acid. The resulting mixture is stirred at room temperature for a period of about 1 hour, at the end of which time the resulting solution darkens slightly. A small amount of pyridine is then added thereby neutralizing the p-toluene sulfonic acid catalyst, water is added, and the precipitate which forms is recovered by filtration, washed with water and then dissolved in chloroform. The chloroform solution is washed twice with water, dried over anhydrous sodium sulfate, evaporated under reduced pressure, and the residual material is crystallized from ethyl acetate to give about 0.4 g. of 3-ethoxy-9α-fluoro-11β-hydroxy-17(N'-acetyl)-ureido-androst-3,5-diene.

Approximately 0.7 g. of 3-ethoxy-9α-fluoro-11β-hydroxy - 17 - (N'-acetyl)-ureido-androst-3,5-diene is added to about 5.25 ml. of t-butyl alcohol, followed by about 1.6 g. of chloranil. The resulting mixture is heated in an oil bath at reflux temperature under nitrogen. Upon heating, complete solution occurs followed by darkening of the reaction mixture. After heating the resulting solution at reflux temperature for a period of about ½ hour, the reaction mixture is cooled to about 30° C., and the excess chloranil is separated by filtration. The filtered solution is evaporated in vacuo, the residual material is extracted with chloroform, and the organic solution is washed with 10% aqueous sodium bisulfite; then with an 0.5 N aqueous solution of sodium hydroxide; and finally with water. The washed chloroform extract is dried over anhydrous sodium sulfate, and the chloroform is evaporated under reduced pressure. The residual material is purified by chromatography over an alumina column, using benzene as the developing solvent, and ether-chloroform mixtures as the eluant. The chromatographed material is recrystallized from benzene to give substantially pure 9α - fluoro - 11β - hydroxy-17-(N' - acetyl)-ureido-androst-4,6-diene-3-one.

Approximately 100 mg. of 9α-fluoro-11β-hydroxy 17-(N′-acetyl)-ureido-androst-4,6-diene-3-one is dissolved in about 10 cc. of boiling ethanol, 2.5 ml. of 2.5 N aqueous hydrochloric acid solution is added, and the resulting mixture is heated at reflux temperature for a period of approximately one hour. About 5 ml. of water is added to the reaction mixture, and the resulting aqueous mixture is evaporated under reduced pressure to a volume of approximately 3 ml. The resulting oily mixture is extracted with chloroform, the chloroform extract is washed several times with water, and the washed chloroform extract is evaporated to give an oil which crystallizes from acetone to give substantially pure 9α-fluoro-11β-hydroxy-17-ureido-androst-4,6-diene-3-one.

EXAMPLE 7

Approximately 0.7 g. of 9α-fluoro-11β-hydroxy-17-(N′-acetyl)-ureido-androst-1,4-diene-3-one, prepared as described in Example 5 hereinabove, is added to approximately 5.25 ml. of t-butyl alcohol, followed by 1.6 g. of chloranil. The resulting mixture is heated in an oil bath at reflux temperature under nitrogen. Upon heating, complete solution occurs followed by darkening of the reaction mixture. After heating the resulting solution at reflux temperature for a period of about ½ hour, the reaction mixture is cooled to about 30° C., and the excess chloranil is separated by filtration. The filtered solution is evaporated in vacuo, the residual material is extracted with chloroform, and the organic solution is washed with 10% aqueous sodium bisulfite; then with an 0.5 M aqueous solution of sodium hydroxide, and finally with water. The washed chloroform extract is dried over anhydrous sodium sulfate, and the chloroform is evaporated under reduced pressure. The residual material is purified by chromatography over an alumina column, using benzene as the developing solvent, and ether-chloroform mixtures as the eluant. The chromatographed material is recrystallized from benzene to give substantially pure 9α-fluoro-11β-hydroxy-17-(N′-acetyl)-ureido-androst-1,4,6-triene-3-one.

Approximately 100 mg. of 9α-fluoro-11β-hydroxy-17-(N′-acetyl)-ureido-androst-1,4,6-triene-3-one is dissolved in about 10 cc. of boiling ethanol, 2.5 ml. of 2.5 N aqueous hydrochloric acid solution is added, and the resulting mixture is heated at reflux temperature for a period of approximately one hour. About 5 ml. of water is added to the reaction mixture, and the resulting aqueous mixture is evaporated under reduced pressure to a volume of approximately 3 ml. The resulting oily mixture is extracted with chloroform, the chloroform extract is washed several times with water, and the washed chloroform extract is evaporated to give an oil which crystallizes from acetone to give substantially pure 9α-fluoro-11β-hydroxy-17-ureido-androst-1,4,6-triene-3-one.

Various changes and modifications may be made in carrying out the present invention without departing from the spirit and scope thereof; to the extent that these changes and modifications are within the scope of the annexed claims, they are to be considered as part of this invention.

What is claimed is:
1. The process of preparing a 3-(hydroxy or ethylenedioxy)-17-ureido-androstane compound which comprises reacting the corresponding 3-oxygenated-17-amino-androstane compound with potassium cyanate.

2. The process, as defined in claim 1, in which a 3-(hydroxy or ethylenedioxy)-17-amino-androst-5-ene compound is reacted with potassium cyanate to produce the corresponding 3-(hydroxy or ethylenedioxy)-17-ureido-androst-5-ene compound.

3. The process, as defined in claim 1, in which the 3-oxygenated-17-amino-androstane compound used as starting material is 3-hydroxy-17-amino-androst-5-ene, and the 3-oxygenated-17-ureido-androstane compound obtained is 3-hydroxy-17-ureido-androst-5-ene.

4. The process, as defined in claim 3, in which the 3-hydroxy-17-amino-androst-5-ene starting material is produced by reacting 3-acetoxy-20-oximino-pregna-5-ene with phosphorus oxychloride in pyridine followed by alkaline hydrolysis of the intermediate 3-acetoxy-17-acetamido-androst-5-ene.

5. The process, as defined in claim 3, wherein the resulting 3-hydroxy-17-ureido-androst-5-ene is reacted with cyclohexanone-aluminum isopropoxide oxidizing agent to produce 17-ureido-androst-4-ene-3-one.

6. A 3-oxygenated-17-ureido-androstane compound characterized as having the following chemical formula:

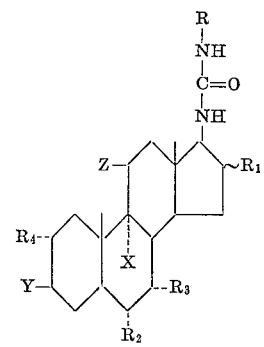

and Δ⁴-dehydro, Δ⁵-dehydro, Δ¹,⁴-bis-dehydro, Δ⁴,⁶-bis-dehydro, and Δ¹,⁴,⁶-tris-dehydro-derivatives; wherein R is hydrogen, or acyl; $R_1$ is hydrogen, α-methyl, β-methyl, or methylene; X is hydrogen or halo; Y is keto, hydroxy, or lower alkanoyloxy; Z is hydrogen, β-hydroxy, or keto; and two of $R_2$, $R_3$, and $R_4$ are hydrogen, the other hydrogen, methyl, or halo, or $R_4$ may be formyl.

7. A 3-oxygenated-17-ureido-androstane compound, as defined in claim 6, having the chemical name 17-ureido-androst-4-ene-3-one.

8. A 3-oxygenated-17-ureido-androstane compound, as defined in claim 6, having the chemical name 17-ureido-androst-1,4-diene-3-one.

9. A 3-oxygenated-17-ureido-androstane compound, as defined in claim 6, having the chemical name 17-ureido-androst-4,6-diene-3-one.

10. A 3-oxygenated-17-ureido-androstane compound, as defined in claim 6, having the chemical name 9α-fluoro-11β-hydroxy-17-ureido-androst-4-ene-3-one.

11. A 3-oxygenated-17-ureido-androstane compound, as defined in claim 6, having the chemical name 9α-fluoro-11β-hydroxy-17-ureido-androst-1,4-diene-3-one.

12. A 3-oxygenated-17-ureido-androstane compound, as defined in claim 6, having the chemical name 16α-methyl-17-ureido-androst-4-ene-3-one.

13. A 3-oxygenated-17-ureido-androstane compound, as defined in claim 6, having the chemical name 16α-methyl-17-ureido-androst-1,4-diene-3-one.

14. A 3-oxygenated-17-ureido-androstane compound, as defined in claim 6, having the chemical name 16α-methyl-9α-fluoro-11β-hydroxy-17-ureido-androst-4-ene-3-one.

References Cited

Acott et al., Tetrahedron Letters, No. 45, pp. 4039–4045, 1965.

Pfitzner et al., Journ. Amer. Chem. Soc., vol. 87, 12/1965, pp. 5670–78.

Schmitt et al., Bull'n Soc. Chim. France, 1964, No. 4, pp. 771–775.

ELBERT L. ROBERTS, Primary Examiner

E. G. LOVE, Assistant Examiner

U.S. Cl. X.R.

260—239.55, 397.45, 397.5, 999